United States Patent [19]
Whitaker et al.

[11] Patent Number: 5,186,520
[45] Date of Patent: Feb. 16, 1993

[54] FORCE ACTIVATED TETHERING DEVICE FOR USE WITH A CHILD SAFETY SEAT IN AN AUTOMOBILE

[76] Inventors: Lenwood C. Whitaker, P.O. Box 18237, Asheville, N.C. 28814; Inge F. Whitaker, 1806 Wright St., Pomona, Calif. 91766; E. Leonard Pate, 1984 N. Main St., Los Angeles, Calif. 90031

[21] Appl. No.: 585,572
[22] Filed: Sep. 20, 1990
[51] Int. Cl.⁵ .............................. A47D 15/00
[52] U.S. Cl. .................................. 297/468; 297/250; 297/464; 297/480; 24/170; 24/136 R
[58] Field of Search ............... 297/250, 216, 468, 479, 297/476, 480, 478, 464; 280/801; 24/179, 194, 68 CD, 136 R

[56] References Cited

U.S. PATENT DOCUMENTS

| | | | |
|---|---|---|---|
| 454,760 | 6/1891 | Osborne | 24/136 R |
| 2,846,745 | 8/1958 | Lathrop | 24/179 |
| 2,876,516 | 3/1959 | Cummings | 24/75 |
| 3,711,154 | 1/1973 | Merola | 297/385 |
| 3,804,434 | 4/1974 | Lacey | 297/468 |
| 3,836,168 | 9/1974 | Nonaka et al. | 280/150 AB |
| 3,872,550 | 3/1975 | Yang | 24/170 |
| 4,312,539 | 1/1982 | Takada | 297/468 |
| 4,339,149 | 7/1982 | Nakao et al. | 297/250 |
| 4,549,770 | 10/1985 | Kurtti | 297/479 |
| 4,591,208 | 5/1986 | McDonald et al. | 297/487 |
| 4,679,852 | 7/1987 | Anthony et al. | 297/464 |
| 4,685,740 | 8/1987 | Fohl | 297/468 |
| 4,727,628 | 3/1988 | Rudholm | 24/170 |
| 4,854,639 | 8/1989 | Burleigh et al. | 297/250 |

FOREIGN PATENT DOCUMENTS 0180310 5/1986 European Pat. Off. ............ 280/801
WO81/00988 4/1981 PCT Int'l Appl. .

Primary Examiner—Kenneth J. Dorner
Assistant Examiner—Milton Nelson, Jr.
Attorney, Agent, or Firm—Robbins, Dalgarn, Berliner & Carson

[57] ABSTRACT

A tethering device for securing a child safety seat to an automobile seat with an automobile seatbelt. The tethering device has a cap, a base, and a wedging mechanism rotatably mounted to the base such that a wedging portion extending upwardly from the base towards the cap will move from a passive position that does not positively grip a seatbelt to a second active-locked position which does positively grip the seatbelt between a wedging surface of the wedging portion and an inside surface of the cap. The tethering devices are secured to each side of the child safety seat at a generally 45 degree angle to the base of the child safety seat.

14 Claims, 3 Drawing Sheets

FORCE ACTIVATED TETHERING DEVICE FOR USE WITH A CHILD SAFETY SEAT IN AN AUTOMOBILE

This invention relates to a device for securing a child safety seat to an automobile seat utilizing the automobile seatbelt and, in particular, to a tethering device that secures the child safety seat to the automobile seatbelt upon sudden deceleration of the automobile.

BACKGROUND OF THE INVENTION

Motor-vehicle crashes are recognized as a major public health problem posing a significant threat across the age spectrum. To address this problem the National Highway and Transportation Safety Administration ("NHTSA") has promulgated standards for vehicle occupant protection. Federal Motor Vehicle Safety Standard (FMVSS) 208, 209, and 210 set the requirements for occupant restraints and FMVSS 213 sets standards for child restraint systems used in motor vehicles. State laws have supported NHTSA's efforts in that all 50 states now require the use of child restraints for infants and young children. Automobile manufacturers have augmented NHTSA's efforts by installing 3-point restraint systems in the front and rear outboard seating positions in all American made cars. Notwithstanding these improvements, motor-vehicle crashes are still one of the highest preventable causes of death and injury to our nation's children.

Five-to-seven year old children are a special group with respect to motor vehicle occupant restraints. Having outgrown child safety seats specifically designed for young children, they must now use the seatbelt systems designed for the adult body configuration. The 3-point restraint system, however, was not designed for a mid-size child. A Type II seatbelt assembly is designed to fit occupants whose weight and dimensions range from those of a 5th-percentile adult female to those of a 95th-percentile adult male (FMVSS 209).

The conventional lap belt is designed to restrain the adult body just below its center of gravity through the antero-superior iliac crests. However, the anterior iliac crests of a child are smaller and not developed to serve as anchor points. Consequently the belt can ride up over the abdomen allowing for submarining, thus causing injury to the intra-abdominal organs. The fitment of the shoulder belt also presents a problem in that it tends to lie anywhere from very high on the child's neck to across the face. This not only impedes the child's view, but is distinctly uncomfortable and more importantly, it loads the neck.

The conventional 3-point restraint system uses a single length of webbing to provide both lap and shoulder restraint. It passes from a floor-mounted retractor attached to the automobile up to a fitting on the B-pillar, then down across the shoulder to a slip-joint on the buckle connector, and from there back across the lap to an outboard floor attachment (FMVSS 209). The slip-joint allows slack created in the retractor-mounted shoulder belt to transfer to the lap belt, thus altering the lap belt's fit.

The behavioral characteristics of young children can influence the protective effect of the adult 3-point restraint system, i.e., the child may lean forward, fidget about, kneel in order to see out, or engage in other activities that compromise the fitment of the belt system. Additionally, medical experts agree that the anatomical characteristics of the child prevent optimum protection.

Although experts agree that belts can afford protection for young children, they warn against the risk of injury when used alone and recommend that belts be used in conjunction with a booster seat. A booster seat is a device consisting of only a seating platform that does not extend up to provide a cushion for the child's back or head (FMVSS 213). The manufacturers of booster seats on the market today have opted to leave off a backrest on these devices because there is no means yet available, prior to the present invention, to prevent a backrest from traveling forward on impact and generating secondary loading onto the child. Such results, as determined by a dynamic sled test, are prohibited by FMVSS 213.

Booster seats are designed to restrain the child and the booster seat by either of two methods: (a) A fixed or removable shield restrains the child's torso and pelvis while the device itself is restrained by routing the lap belt around the outer circumference of the shield; (b) Lap belt guides on each side of the booster seat serve to retain the device and to position the lap belt across the child's pelvis; the torso is restrained by the shoulder belt.

Booster seats have many disadvantages. Primarily, it is difficult to restrain the child in the booster seat and, at the same time, properly secure the booster seat to the automobile seat so that, in the event of a sudden stop, the booster seat and the child are both properly restrained without injury to the child. Inherent shoulder belt slack can transfer via the slip-joint to the lap belt, thus compromising the fitment of the seatbelt system. A snugly fitting shield is inconvenient for the child and, alternatively, if left fitting loosely, allows the child to build up momentum during an accident prior to contact with the shield. The lack of a backrest on the booster seat precludes proper positioning of the shoulder belt. The child's back is supported only by the automobile seat back which provides neither lateral nor neck support. For these and other reasons, booster seats for mid-size children have a low usage rate.

Adding a backrest to a booster seat can enhance the child's comfort and can provide lateral and neck support. The backrest also acts as a guide for the shoulder belt. Testing of a seat having a backrest, however, revealed that, upon impact or sudden deceleration of the automobile, the back of the seat travels forward and applies additional impact forces upon the child.

SUMMARY OF THE INVENTION

The present invention is a force activated tethering device that can be used to safely secure a child safety seat to an automobile seatbelt. The device is incorporated into the child safety seat's frame structure and is fastened to the lap belt portion of the 3-point restraint system of the automobile. This invention tethers the child safety seat to the lap belt portion by means of a two-way wedging mechanism that reacts to any force applied to the lap belt in either direction, thus preventing the child safety seat, including a child safety seat having a backrest, from traveling forward and loading onto the child during sudden deceleration. Moreover, the device also prevents shoulder belt slack from transferring to the lap belt.

The tethering devices described herein are symmetrical and affixed one on each side of the child safety seat. The child is placed in the seat and, with both of the tethering devices open, the lap and shoulder belt portions of the automobile's 3-point restraint system are placed about the child and secured to the seatbelt buckle. The path of the lap belt is interfaced with the bottom half of the tethering devices on both sides of the seat and the wedging mechanism is then placed in a ready mode by closing and fastening the top half of the tethering device over the belt.

Inside each of the tethering devices is the wedging mechanism that holds the belt firmly in place. The wedging mechanism is designed to be in a passive state, i.e., it does not place a significant wedging force on the lap belt, until sudden forces are exerted on the belt. While in the passive state, the wedging mechanism is void of any significant stress, thus it is free to react immediately to any sudden loading force that may be applied and to distribute the load properly. Further, the passivity of the wedging mechanism minimizes possible abrasion of the lap belt.

The tethering devices are placed at an angle on each side of the child safety seat. Preferable, the angle is set so that the lap belt, when buckled, passes through each tethering device at a right angle to the tethering device. This placement of the device will correctly position the lap belt across the root of the thighs of the child as recommended by medical and biomechanical experts. The lap belt will also remain snug despite inherent slack in the shoulder belt. Additionally, upon sudden deceleration, the force acting on the belt will not exert excessive shearing forces on the tethering devices which otherwise may separate the devices from the child safety seat.

The angle of placement of the tethering device on the side of the seat may be optimized to take into consideration the varying lap belt buckle configurations in a particular automobile's restraint system. Generally, however, a 45 degree angle to the base of the seat with placement of the tethering device below the seating portion of the safety seat and behind the pivot point of the safety seat, i.e., behind the lower front end of the seat, will be satisfactory.

Ideally, the tethering device should be used on a child safety seat having a backrest. The backrest may have a concave shape to provide lateral support. A headrest may also be provided. The backrest and/or headrest may be adjustable depending on the size of the child. Such a seat would allow a mid-size child to make optimum use of the 3-point restraint system by geometrically positioning the child within its configuration, thereby distributing dynamic forces over the thorax area and across the root of the thighs.

DETAILED DESCRIPTION

As required, a detailed illustrative embodiment of the present invention is disclosed herein. However, a force activated tethering device in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiments for purposes of disclosure and to provide a basis for the claims herein which define the scope of the present invention.

Figure 1:
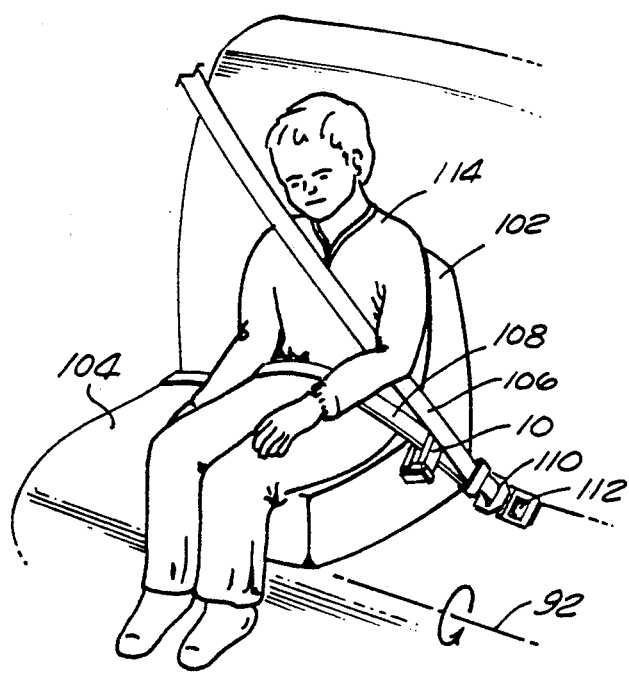
FIG. 1 is a perspective view of a mid-size child on a safety seat with tethering devices attached.

A generalized version of a child safety seat 102 is shown in FIG. 1 resting on an automobile seat 104. A 3-point restraint system of the automobile having a shoulder belt 106, a lap belt 108, a slip joint connector 110 and a buckle portion 112 extending from the automobile seat 104 is shown in use around a mid-size child 114. A tethering device 10 is shown attached on one side of the child safety seat with the lap belt 108 passing through it. Another tethering device is located on the other side of the child safety seat and also receives the lap belt in a similar manner. The child safety seat may be covered with an outer fabric. It will appreciated that many different means are available for attaching the tethering devices to the child safety seat, the specific details of which could be successively varied depending on the situation by one of ordinary skill in the art. One means of attachment is discussed in more detail in connection with FIG. 7.

Figure 2:
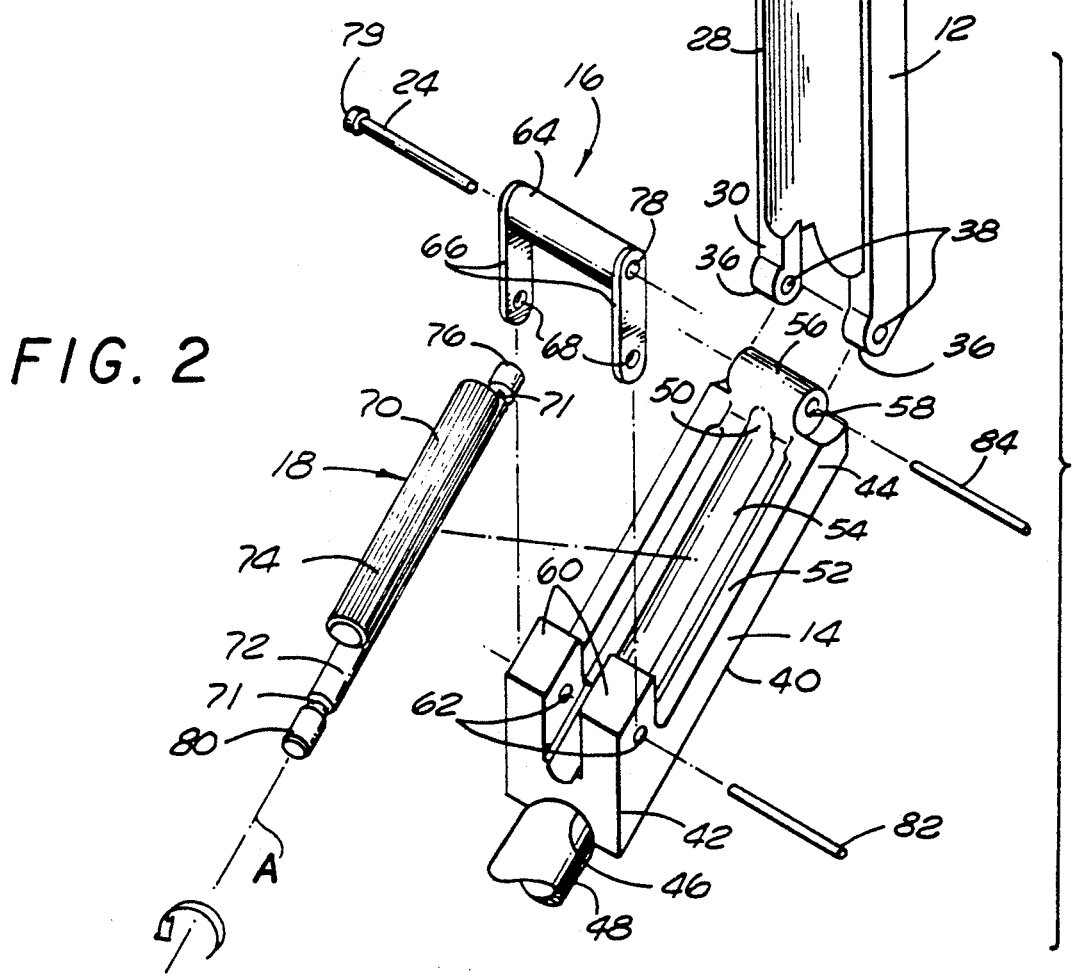
FIG. 2 is an exploded view of the preferred embodiment of the tethering device.

Referring to FIG. 2, the tethering device 10 is shown having a cap 12, a base 14, a latching mechanism 16 and a wedging mechanism 18. The cap 12 is preferably formed of metal and has a top surface 20, a latching end 22 and a hinged end 30. The cap 12 may be machined, molded or formed. Other materials of suitable strength may also be used. At the latching end 22 of the top surface 20 there is a groove 26 for receiving a latching pin 24 of the latching mechanism 16. A bottom surface 28 of the cap has a concave inside surface 32 for receiving a wedging portion 70 of the wedging mechanism 18, a lateral support knob 34 at the latching end 22, and a pair of hinge supports 36 having pin receiving portions 38 at the hinged end 30 of the cap 12.

The base 14 also is preferably formed of metal and has a bottom surface 40, a latching end 42 and a hinged end 44. The bottom surface 40 has a curved longitudinal portion 46 for receiving a support tube 48, preferably made of steel, which may be welded or otherwise secured to the bottom surface 40. A top surface 52 of the base 14 has a concave inside surface 54 for receiving a support portion 72 of the wedging mechanism 18, a hinge support 56 having a pin receiving portion 58 at the hinged end 44 and a pair of latch supports 60 at the latching end 42, each latch support 60 having pin receiving portions 62. The hinge support 56 also has a cylindrical receiving portion 50 for receiving therein a first end 76 of the support portion 72 of the wedging mechanism 18.

The latching mechanism 16 has a latching portion 64 with projecting supports 66 extending from each end of the latching portion 64. Each projecting support has a pin receiving portion 68 at its distal end. The projection supports 66 also each have latching portions 64 and a passage 78 through which the latching pin 24 passes. A head 79 is placed on the latching pin to allow the pin to be easily grasped and to prevent the pin from fully entering the passage 78.

The wedging portion 70 of the wedging mechanism 18 is cylindrical and its length in the longitudinal direction is less than the distance between the hinge support 56 and the latch supports 60 of the base 14 enabling the wedging portion 70 to fit between the hinge support 56 and latch supports 60. The wedging portion 70 has a wedging surface 74 that may be knurled or otherwise roughened. The support portion 72 of the wedging mechanism 18 is also cylindrical and is secured as by welding in the longitudinal direction to the wedging portion 70. The diameter of the support portion 72 is less than the diameter of the wedging portion 70. The length of the support portion is the same as the length of the base 14. The support portion 72 also has a pair of lateral indentations 71 about its circumference, one near each end of the support portion 72.

Figure 4:
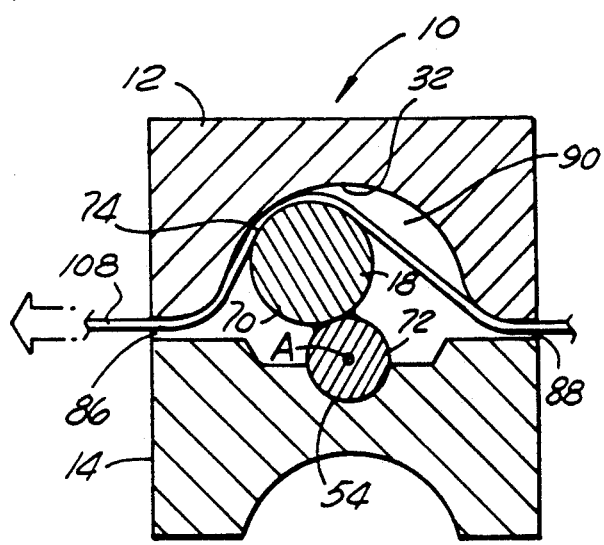
FIG. 4 is a side sectional view of the tethering device in an active-locked position.
Figure 5:
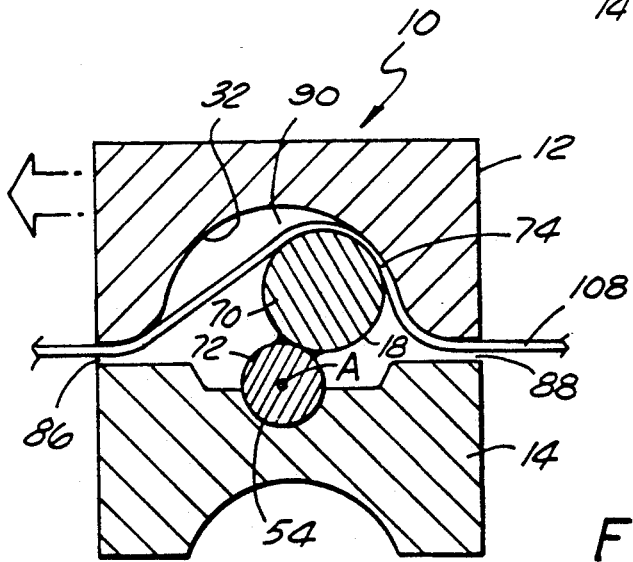
FIG. 5 is a side sectional view of the tethering device in another active-locked position.

To assemble the tethering device, the first end 76 of the support portion 72 of the wedging mechanism 18 is inserted into the base 14 through the cylindrical receiving portion 50 of the hinge support 56. The remainder of the support portion 72, including a second end 80 of the support portion 72, rests over the concave inside surface 54 of the base, the second end 80 of the wedging mechanism 18 resting between the latch supports 60 of the base. The wedging portion 70 accordingly is projecting upwardly from the support portion 72 of the wedging mechanism 18 when resting in the base 14. Referring to FIGS. 2, 4 and 5, it is seen that the wedging mechanism 18 rotates on the base 14 along axis of rotation A due to the freedom of movement between the support portion 72 of the wedging mechanism and the concave surface 54 of the base.

The latching mechanism 16 is assembled to the base 14 by placing the projecting supports 66 of the latching mechanism on either side of the latch supports 60 of the base and inserting a latch pin 82 through the respective pin receiving portions 62, 68. Preferably, the latch pin 82 is designed to pass through one of the lateral indentations 71 of the wedging mechanism 18, thus cooperating with the support portion 72 to prevent the wedging mechanism 18 from moving in a longitudinal direction in the base 14.

To allow the cap 12 to be assembled, the latching mechanism 16 is rotated counterclockwise away from the top surface 52 of the base. The cap 12 is then assembled by placing the hinge supports 36 of the cap around the hinge support 56 of the base and inserting a hinge pin 84 through the respective pin receiving portions 38, 58. Preferably, the latch pin 84 passes through the other lateral indentation 71 of the wedging mechanism 18 in the manner described above.

To place the cap 12 in an assembled position, the cap is rotated counterclockwise about the hinge supports 36 such that the lateral support knob 34 at the latching end 22 of the cap is inserted between the latch supports 60 of the base 14. As will be explained in greater detail in connection with FIGS. 3-5, the concave inside surface 32 of the cap and the wedging surface 74 of the wedging mechanism 18 are located at varying distances from each other depending on the rotated position of the wedging mechanism.

Figure 7:
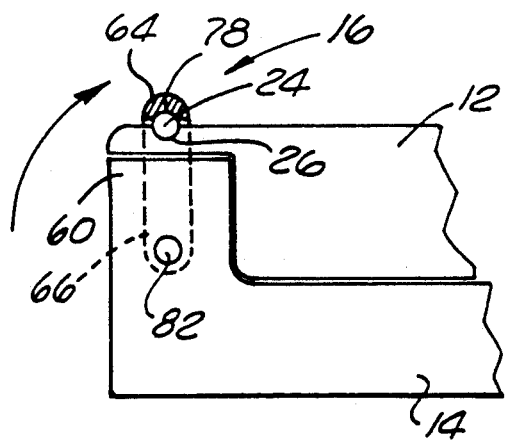
FIG. 7 is a fragmented side view of the assembled tethering device shown in FIG. 2.
Figure 8:
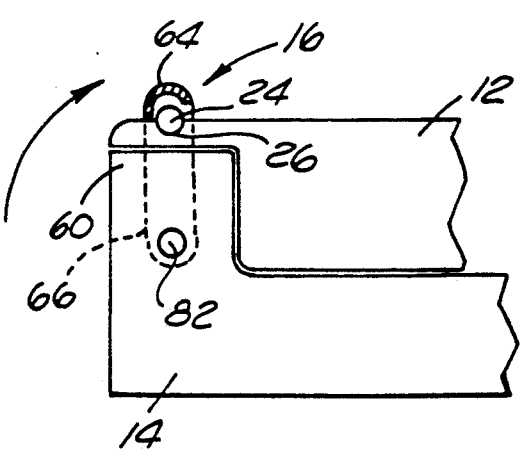
FIG. 8 is a fragmented side view of an alternative latching mechanism to that shown in FIG. 7.

To secure the tethering device in the assembled position, the latching mechanism 16 is rotated clockwise over the cap 12 until the passage 78 of the latching mechanism communicates with the groove 26 on the top surface 20 of the cap as shown in FIG. 7. The latching pin 24 is then inserted through the passage 78 to engage groove 26, holding the cap 12 to the base 14. It will be appreciated that many different means are available for hinging and latching the cap to the base, the specific details of which could be successfully varied depending on the situation by one of ordinary skill in the art.

As can be seen in FIG. 1, the lap belt 108 passes through the tethering device 10 between the cap 12 and the base 14 and is secured to the buckle portion 112. The child is now secured in the child safety seat. Upon sudden deceleration of the automobile, however, the child and the child safety seat will be momentarily propelled forward, at least until the 3-point restraint system restrains both. This will result in at least one of two different situations occurring within the tethering device. In the first situation, the propelled child will exert a force on the lap belt causing the belt to move with respect to the tethering device in the direction of propulsion (see arrow in FIG. 4). In a second situation, the seat propels forward causing the tethering device to move with respect to the belt in the direction of propulsion (see arrow in FIG. 5). In either case, as will be shown below, the tethering device will operate to isolate the forces acting upon the child safety seat. The child safety seat 10 will be restrained by the tethering devices and, in turn, the child will be restrained within the seat as a result of the lap belt and shoulder belt.

Figure 3:
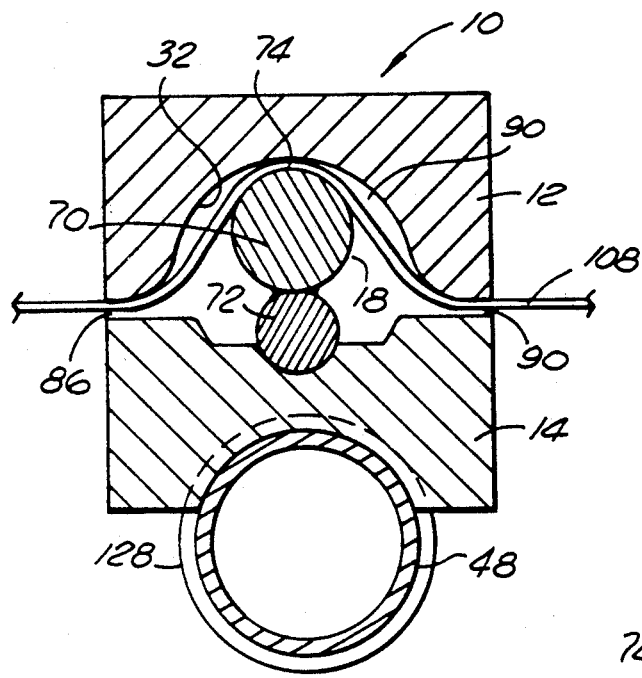
FIG. 3 is a side sectional view of the tethering device in the passive position.

Referring to FIGS. 3-5, cross sectional views of the assembled tethering device 10 are shown. The lap belt 108 is shown entering an entrance portion 86 of the assembled cap 12 and base 14, passing through a communicating portion 90 between the concave inside surface 32 of the cap 12 and the knurled wedging surface 74 of the wedging mechanism 18, and leaving the tethering device through an exit portion 88 between the cap 12 and the base 14.

FIG. 3 depicts the tethering device in the totally upright passive-unlocked position (the ready mode) wherein the lap belt 108 has some movement within the tethering device since clearance is provided completely through the cap and base, i.e., the upwardly projecting wedging portion 70 of the wedging mechanism 18 is not exerting a significant wedging force on the lap belt 108 against the concave inside surface 32 of the cap 12. FIG. 4 depicts the situation where a force is acting on the lap belt 108 in the direction shown. The force on the belt causes the wedging mechanism to rotate in the direction of the force which causes the lap belt to be secured between the wedging portion 70 and the concave inside surface 32 in an active-locked position. Once the wedging portion has gripped the lap belt, then, as forces applied to the belt increase, the rotation of the wedging mechanism tends to also increase, applying greater pressure by the wedging mechanism against the lap belt and against the concave inside surface thereby ever more positively securing the tethering device, and thus the child safety seat, to the lap belt.

FIG. 5 depicts a similar situation where a force is acting on the tethering device (e.g., the safety seat is propelled forward). The force on the tethering device causes the wedging mechanism to rotate in the opposite direction until it wedges the belt against the concave inside surface of the cap in a second active-locked position. Since the lap belt is secured to the automobile, the child safety seat is precluded from moving relative to the automobile. Furthermore, since the child is positioned within the safety seat with the lap and shoulder belts in place, the belts also do not move relative to the child and, therefore, adequately restrain the child within the safety seat.

It will be appreciated that the wedging force on the belt between the wedging mechanism and the concave inside surface of the cap can be adequately achieved by a variety of configurations and surface textures of the wedging mechanism and the concave inside surface. In the preferred embodiment, the wedging surface 74 of the wedging mechanism has a constant radius and the concave inside surface 32 has a curvature that varies. The situation may be reversed, however, or alternatively, both surfaces may have varying curvature. Similarly, one or both of the wedging surface and the concave inside surface may be knurled or otherwise roughened to more positively grip and restrain the lap belt.

The upwardly projecting wedging portion 70 of the wedging mechanism must, at a minimum, be sufficiently rotatable to allow the wedging portion to move into the active-locked positions. Rotation may be provided by a hinge support or by making the wedging portion out of a sufficiently resilient material that allows it to move from the passive-unlocked position to the active-locked positions and back again. The wedging mechanism may also include a righting mechanism, such as a spring (not shown), to return the upwardly projecting wedging portion to the totally upright passive position when decelerating forces are not being applied.

The best placement of the tethering device on the child safety seat requires consideration of a number of factors. Referring to FIG. 1, the bottom front portion of the safety seat will act as a pivot axis 92 during sudden deceleration of the automobile. Accordingly, the tethering device should be behind the pivot axis to prevent the safety seat from turning over onto the child. Preferably, the tethering device should also be as near to the automobile seat 104 as possible to reduce the length of the lap belt between the child safety seat and the automobile seat. A shorter length will reduce any likelihood of twisting of the safety seat during an accident. Positioning of the tethering device near the bottom of the seat, however, is sometimes restricted by the length of the buckle portion 112 extending from the automobile seat. Such buckle portions are too thick to pass through the tethering device. The tethering device should therefore be optimally placed above the bottom of the safety seat to accommodate varying buckle stem heights.

The tethering device should also be placed at an angle on the side of the safety seat. The angle is optimally determined by noting the location of the lap belt on the side of the child safety seat when it is placed over the root of the thighs of a seated child. The tethering device should be placed such that this same location of the lap belt is preserved without causing the lap belt to change direction in the device. In other words, the longitudinal axis of the lap belt should optimally be perpendicular to the longitudinal axis of the tethering device. Such a location will reduce abrasion of the belt and further reduce the shearing forces that may arise in the tethering device during sudden deceleration of the automobile.

With the tethering devices in the optimal position on the sides of the safety seat, a child may be easily secured within the seat. After the child is placed in the seat and the shoulder belt and lap belt buckled, the tethering devices may be opened. The lap belt is then placed in each device between the concave inside surface of the cap and the wedging mechanism. Each device is then closed and latched over the lap belt. The shoulder belt should now be over the thorax of the child and the lap belt over the root of the child's thighs making optimum use of the 3-point restraint system. The tethering devices will also resist movement of any slack in the shoulder belt into the lap belt through the slip joint connector 110, thus helping to keep the lap belt snug against the child.

Figure 6:
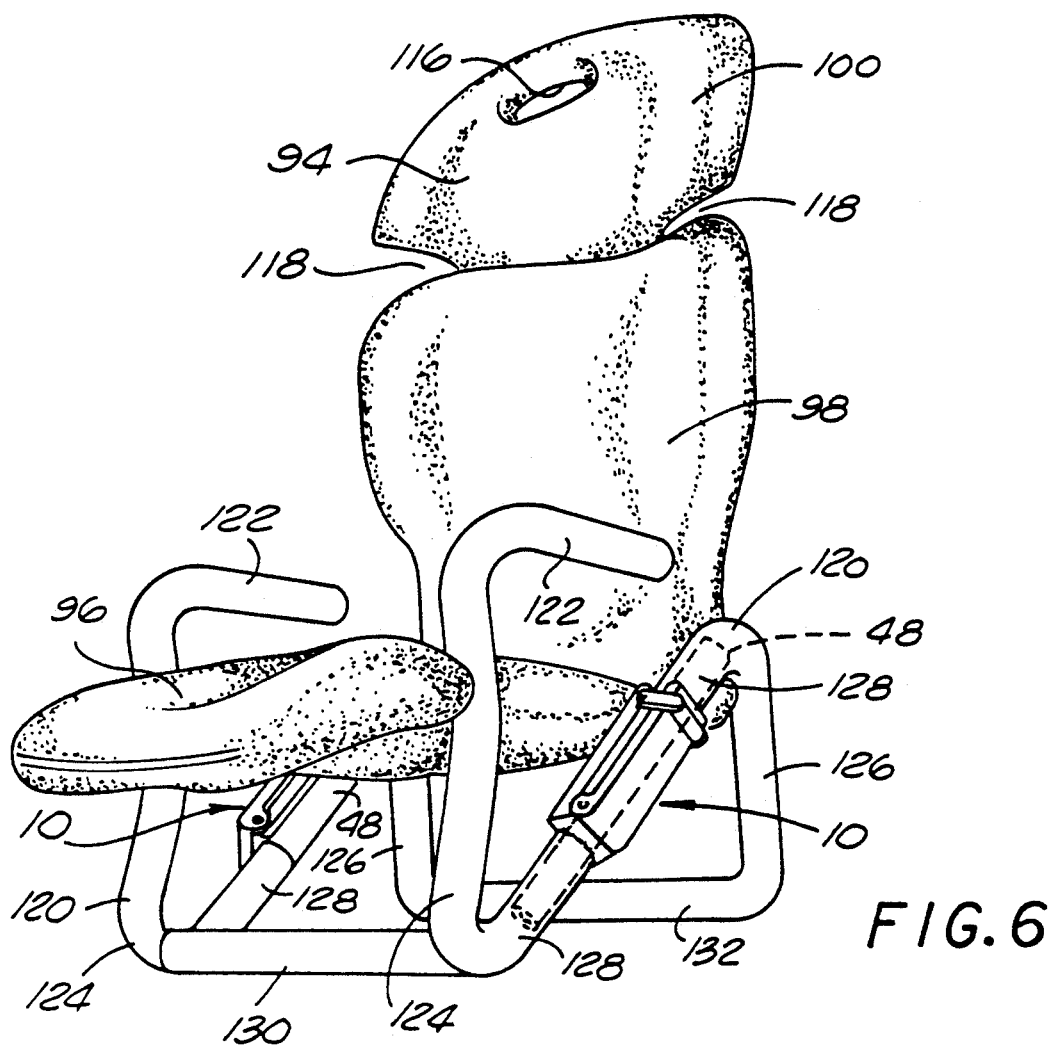
FIG. 6 is a perspective view of the preferred embodiment of a child safety seat with tethering devices.

A preferred embodiment of a child safety seat using the tethering devices is shown in FIG. 6. The child safety seat 94 has a seating portion 96 integrally connected to a backrest 98 and headrest 100. Alternatively, the seating portion may be hinged to the backrest to allow folding of the seat. The backrest can also be made adjustable to adjust its height to the size of the child.

The seating portion 96, backrest 98, and headrest 100 are padded and reinforced, e.g., a fiberglass sheet covered with a foam material and an outer fabric may be used. Metal reinforcing may also be used. The headrest has a handgrip 116 for grasping and carrying the child safety seat. A pair of shoulder belt guide portions 118 is also shown located between the headrest and the backrest to properly guide the shoulder belt over the child. The headrest and backrest may also be concave shaped to provide lateral support for a seated child.

The preferred child safety seat 94 also has a support frame 120 on each side of the safety seat made from steel or aluminum tubing malleable enough for production bends, yet with sufficient structural integrity to withstand the weight of a mid-size child and the high G-forces possible due to sudden deceleration of the automobile. As shown, each support frame 120 has an armrest 122, a vertical front support 124 and a vertical rear support 126. Tethering device connectors 128 are integrally connected to the bottom of the front support and to the top of the rear support at a 45 degree angle. The support frames 120 are attached together by a front base bar 130 and a rear base bar 132 which rest on the automobile seat. The support frames should also be attached together above the base bars, e.g., just under the seating portion 96 at the front and back of the seat or through the seating portion. The armrest should be separated from the backrest to allow the seatbelt to be easily placed around a seated child.

As previously noted, each tethering device has a steel support tube 48(see FIG. 3). This tube extends from either end of the tethering device 10 and is inserted and welded to the tethering device connectors 128 of each support frame 120. A similar tethering device could be used in connection with the shoulder belt and placed near each shoulder belt guide 118.

The child safety seat depicted in FIG. 6 was tested at the University of Michigan Transportation Research Institute using a test dummy that simulated a six year old child. The test was run at about 30 mph with an average acceleration of about 20 g. Upon sudden deceleration, the force acting on the child safety seat was successfully isolated by the tethering devices and the tethering devices kept the full weight of the child safety seat from loading on the test dummy. The seat configuration controlled the test dummy's body throughout the duration of the simulated crash and maintained total stability and alignment. The placement of the lap belt across the root of the thighs, eliminated the possibility of submarining. The test data and graphs were further evaluated by engineers who concluded that the data and graphs showed no peaks indicating secondary loading on the test dummy. Six months of field testing on the tethering devices has revealed no sign of abrasion to the belt webbing.

As shown in the above embodiments, the present invention discloses a force activated tethering device to restrain a child in a child safety seat during sudden deceleration of an automobile. It will be appreciated that many different embodiments of the present invention may be employed. While certain exemplary structures and operations have been described herein, the appropriate scope hereof is deemed to be in accordance with the claims as set forth below.

What is claimed is:

1. A tethering device for securing a child safety seat to an automobile seat with an automobile seatbelt, said tethering device comprising:
   a cap having a curved inside surface and a wedging mechanism comprising a cylindrical wedging portion having a curved wedging surface and a cylindrical support portion that is fixedly secured along it length to the cylindrical wedging portion;
   said cap and said wedging mechanism having an assembled passive position wherein said wedging surface faces said curved inside surface and said wedging surface and said curved inside surface for a nonlinear passage therebetween for said seatbelt to pass through; and
   a means for permitting said wedging surface to move between said passive position and a first active locked position by rotation of the wedging mechanism in a first direction when said cap and wedging mechanism are in the assembled position, said passive position existing when said wedging surface is at a first predetermined distance from said inside surface and said first active locked position existing when said wedging surface is sufficiently closer to said inside surface to place a wedging force on said automobile seatbelt therebetween.

2. A tethering device for securing a child safety seat to an automobile seat with an automobile seatbelt, said tethering device comprising:
   a cap having a curved inside surface, a base having a top surface having a curved portion and a bottom surface and a wedging mechanism having a wedging surface and a proximal end contacting said base;
   said cap, base and wedging mechanism having an assembled position wherein said cap is mounted to said base with said curved inside surface of said cap facing said top surface of said base and wherein said proximal end of said wedging mechanism contacts said curved portion of said top surface of said base to rotatably mount said wedging mechanism to said base and said wedging mechanism extends upwardly towards said inside surface of said cap and terminates with said wedging surface opposing said curved inside surface to form a nonlinear passage between said wedging surface and said curved inside surface for said seatbelt to pass through; and
   a means for permitting said wedging surface to move between a passive position and an active locked position when said cap, base and wedging mechanism are in the assembled position, said passive position existing when said wedging surface is at a first predetermined distance from said opposed inside surface and said active locked position existing when said wedging surface is rotated sufficiently closer to said inside surface to place a wedging force on said automobile seatbelt when said seatbelt is located laterally in said passage between said wedging surface and said inside surface.

3. A tethering device for securing a child safety seat to an automobile seat with an automobile seatbelt, said tethering device comprising:
   a base having a concavely shaped surface and a cap, said cap having an inside surface that faces said base when said base and cap are reassembled;
   a wedging mechanism rotatably mounted to said base and having a cylindrical support portion fixedly secured along its length to a cylindrical wedging portion having a wedging surface extending towards the inside surface of said cap when said base and cap are assembled, said cylindrical support portion having a smaller diameter than said cylindrical wedging portion and said cylindrical support portion cooperatively engaging said concavely shaped surface of said base to allow rotation of said wedging mechanism;
   said base, cap and wedging mechanism defining an entrance opening between said assembled base and cap providing a passage into said tethering device, an exit opening between said assembled base and cap providing a passage out of said tethering device and a gap between said cap and said wedging mechanism providing a passage between said passage into said tethering device and said passage out of said tethering device, said gap between said cap and said wedging mechanism being nonlinear to said entrance opening passage and said exit opening passage;
   said wedging mechanism having a passive position when said wedging surface is a first predetermined distance away from said inside surface of said cap permitting the seatbelt to fit between said inside surface and said wedging surface and having an active-locked position when said wedging surface is rotated closer to said inside surface, causing said wedging surface and said inside surface to contact said seatbelt in a wedging relation; and
   a latching mechanism for retaining the cap and base in the assembled position.

4. A tethering device for securing a child safety seat to an automobile seat with an automobile seatbelt, said tethering device comprising:
   a base and a cap, said cap having an inside surface;
   a wedging mechanism rotatably mounted to said base and having an upwardly projected portion with a wedging surface at its distal end, said upwardly projecting portion extending towards the inside surface of said cap when said base and cap are assembled;
   said base, cap and wedging mechanism defining an entrance opening between said assembled base and cap providing a passage into said tethering device, an exit opening between said assembled base and cap providing a passage out of said tethering device and a gap between said cap and said wedging mechanism providing a passage between said passage into said tethering device and said passage out of said tethering device, said gap between said cap and said wedging mechanism being nonlinear to said entrance opening passage and said exit opening passage;

said wedging mechanism having a passive position when said wedging surface is a first predetermined distance away from said inside surface of said cap, having a first active-locked position when said wedging mechanism is rotated in a first direction causing said wedging surface to move closer to said inside surface, and having a second active-locked position when said wedging mechanism is rotated in a second direction away from said first direction also causing said wedging surface to move closer to said inside surface; and a latching mechanism for retaining the cap and base in the assembled position.

5. A child safety seat for use in an automobile, comprising:

a seating portion having a seating surface and a support frame having a base for resting the child safety seat on an automobile seat of the automobile and side supports on each side of the seating portion and attached to the base for supporting the seating portion above the base;

a pair of tethering devices, one fixedly secured to each side support of the support frame, respectively, each tethering device comprising a cap having a curved inside surface and a wedging mechanism having a wedging surface, said cap and said wedging mechanism having an assembled passive position wherein said wedging surface faces said curved inside surface and said wedging surface and said curved inside surface form a nonlinear passage therebetween for said seatbelt to pass through, and a means for permitting said wedging surface to move between said passive position and a first active locked position when said cap and wedging mechanism are in the assembled position, said passive position existing when said wedging surface is at a first predetermined distance from said inside surface and said first active locked position existing when said wedging surface is sufficiently closer to said inside surface to place a wedging force on said automobile seatbelt therebetween.

6. A tethering device for securing a child safety seat to an automobile seat with an automobile seatbelt, said tethering device comprising:

a cap having a curved inside surface, a base and a wedging mechanism comprising a cylindrical support portion and a cylindrical wedging portion having a wedging surface, said cylindrical support portion fixedly secured along it length to said cylindrical wedging portion;

said cap, base and wedging mechanism having an assembled passive position wherein said wedging mechanism is rotatably mounted to said base, extends toward said inside surface of said cap and terminates with said wedging surface facing said curved inside surface to from a nonlinear passage between said wedging surface and said curved inside surface for said seatbelt to pass through; and a means for permitting said wedging surface to move between the passive position and an active locked position when said cap, base and wedging mechanism are in the assembled position, said passive position existing when said wedging surface is at a first predetermined distance from said inside surface and said active locked position existing when said wedging surface is rotated in a first direction sufficiently closer to said inside surface to place a wedging force on said automobile seatbelt therebetween.

7. A tethering device according to claim 6 wherein said cylindrical support portion of said wedging mechanism has a smaller diameter than the cylindrical wedging portion of said wedging mechanism.

8. A tethering device according to claim 6 wherein said means permits said wedging surface to move to a second active locked position by rotation of the wedging mechanism in a second direction away from the first direction.

9. A tethering device according to claim 8 wherein said base includes a concavely shaped surface for cooperatively engaging said cylindrical support portion of said wedging mechanism to permit the rotation of said wedging mechanism.

10. A child safety seat for use in an automobile, comprising:

a seating portion having a seating surface and a support frame having a base for resting the child safety seat on an automobile seat of the automobile and side supports on each side of the seating portion and attached to the base for supporting the seating portion above the base; and a pair of tethering devices, each comprising a cap having a curved inside surface, a base having a top surface and a bottom surface and a wedging machining having a wedging surface, said bottom surface of said base of each tethering device being fixedly secured to a respective side support below the seating surface, said cap, base and wedging mechanism having an assembled position wherein said wedging mechanism is mounted to said base, extends toward said inside surface of said cap and terminates with said wedging surface opposing said curved inside surface to form a nonlinear passage between said wedging surface and said curved inside suffrage for said seatbelt to pass through, and a means for permitting said wedging surface to move between a passive position and an active locked position when said cap, base and wedging mechanism are in the assembled position, said passive position existing when said wedging surface is at a first predetermined distance from said opposed inside surface and said active locked position existing when said wedging surface is moved sufficiently closer to said inside surface to place a wedging force on said automobile seatbelt when said seatbelt is located in said passage between said wedging surface and said inside surface.

11. The child safety seat of claim 10 wherein each wedging mechanism has an axis of rotation that is neither parallel nor perpendicular to a planar surface upon which said base rests.

12. The child safety seat of claim 11 wherein the axis of rotation of each wedging mechanism is generally disposed at a 45 degree angle to the planar surface upon which said base may rest.

13. The child safety seat of claim 11 further comprising a backrest secured to the support frame and concavely shaped to provide lateral support to a child seated in the child safety seat.

14. The child safety seat of claim 13 further comprising a headrest secured to the top of the backrest and a pair of shoulder belt guide means between said headrest and backrest, one for each side of the child safety seat, for guiding a shoulder belt of the automobile across the shoulder of a seated child.

* * * * *